L. G. FLEMING.
VEHICLE WHEEL TIRE.
APPLICATION FILED JAN. 25, 1911.
1,021,307.
Patented Mar. 26, 1912.
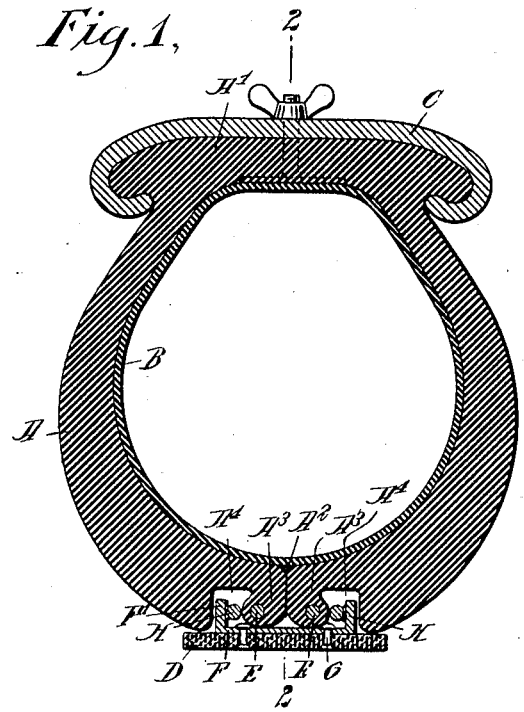
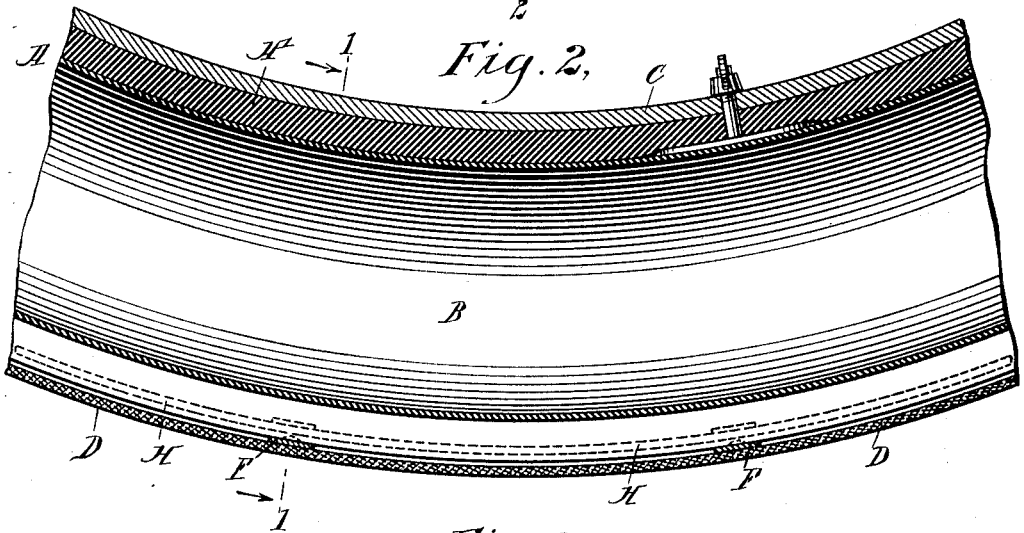
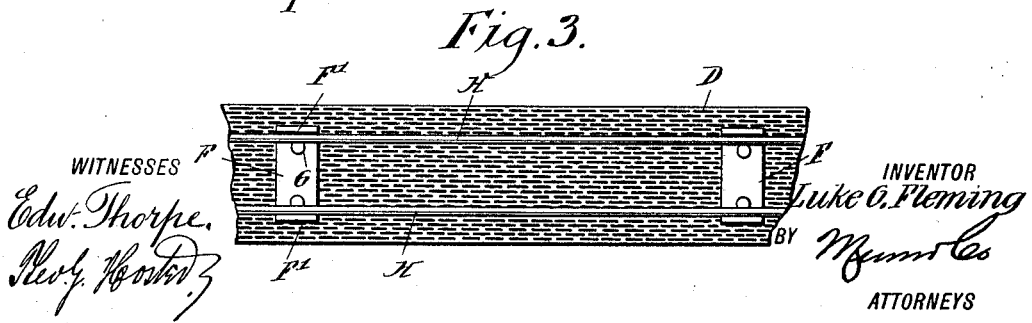

UNITED STATES PATENT OFFICE.

LUKE G. FLEMING, OF TARRYTOWN, NEW YORK.

VEHICLE WHEEL-TIRE.

1,021,307.  Specification of Letters Patent.  Patented Mar. 26, 1912.

Application filed January 25, 1911. Serial No. 604,523.

*To all whom it may concern:*

Be it known that I, LUKE G. FLEMING, a citizen of the United States, and a resident of Tarrytown, in the county of Westchester and State of New York, have invented a new and Improved Vehicle Wheel-Tire, of which the following is a full, clear, and exact description.

The invention relates to tires having an outer casing or a shoe and an inner inflatable tube, and the object of the invention is to provide a new and improved wheel tire for automobiles and other vehicles, and arranged to permit convenient opening of the outer casing for the insertion or removal of the inner tube without detaching the outer casing from the rim of the wheel.

For the purpose mentioned the outer casing is split lengthwise along its peripheral face and a tread is removably attached to the outer casing to close the split.

A practical embodiment of the invention is represented in the accompanying drawings forming a part of this specification, in which similar characters of reference indicate corresponding parts in all the views.

Figure 1 is a cross section of the wheel tire on the line 1—1 of Fig. 2; Fig. 2 is a longitudinal central section of the same on the line 2—2 of Fig. 1; and Fig. 3 is an inverted plan view of part of the tread.

The outer casing or shoe A is adapted to contain an inflatable tube B and is fastened at its solid base A' to the wheel rim C in any suitable manner, and although I have shown the connection of the base A' with the rim C in the form of a clencher fastening, I do not limit myself to this particular mode of attaching the solid base A' to the rim C. The outer casing A has a split A² on the peripheral face and extending lengthwise of the outer casing, so that the latter can be readily opened for the insertion or removal of the inner tube B without detaching the outer casing A from the rim C. An annular tread D overlies the split A² and the adjacent peripheral portions of the outer casing A, as plainly indicated in Fig. 1, and the said tread D is removably attached to the outer casing A and is preferably made of a flat woven wire fabric, as indicated in the drawings.

In order to removably attach the tread D to the outer casing A, the following arrangement is made: The portions of the outer casing A adjacent to the split A² are formed into annular ribs A³ having a reinforcement E in the form of a wire, cable or the like, and adjacent to the outer sides of the ribs A³ are annular recesses A⁴ formed in the casing A for the reception of engaging and locking members held on the inner face of the tread D and formed by clips F, attached by the use of rivets G to the inner face of the tread D, the clips F having angular flanges F', to the inner sides of which are secured engaging and locking ribs H, preferably in the form of wires, engaging the outer sides of the reinforced ribs A³, as plainly indicated in Fig. 1.

It is understood that when the inner tube B is inflated an outward pressure is exerted on the shoe A so that the reinforced ribs A³ are moved in firm contact with the ribs H of the tread D, and consequently the tread D is securely held in position on the outer casing A, and when it is desired to open the casing A the inner tube B is deflated so as to relieve the outer casing of outward pressure and permitting convenient disengagement of the ribs H from the ribs A³ for the removal of the tread D. When this has been done the outer casing A can readily be opened at the split A² for the removal of the inner tube B and insertion of a repaired or a new one, as the case may be.

It is understood that the flanges F' of the clips F and the ribs H extend into recesses A⁴, so that the locking parts are confined between the outer surface of the casing A and the inner face of the tread D, and the said recesses A⁴ are closed by the tread D, as the latter extend sidewise beyond the said recesses A⁴, as plainly shown in Fig. 1.

The tread D, with the clips F and the ribs H in position on the tread, is preferably dipped in rubber prior to its use on the casing A, so as to protect the metallic locking members of the tread D against corrosion.

It will be noticed that by having the tread D made of flat woven wire fabric the desired flexibility combined with durability is obtained, and at the same time the tread D is punctureproof. In case the tread D is worn it can be readily replaced by a new one without requiring renewal of the casing A.

Having thus described my invention, I claim as new and desire to secure by Letters Patent:

1. A wheel tire comprising an outer casing having a split along the peripheral face of the casing and in the direction of the length thereof, the said casing being provided with ribs at the sides of the split and recesses at the outer sides of said ribs, a tread overlying the said split, ribs and recesses, spaced members secured on the inner face of the tread and having flanges extending into the said recesses, and ribs on the said flanges and extending lengthwise within said recesses, the said ribs engaging the sides of the casing ribs.

2. A wheel tire, comprising an outer casing having a split along the peripheral face of the casing and in the direction of the length thereof, the outer casing being provided with elastic and integral reinforced ribs at the sides of the split and exterior recesses adjacent the said ribs, a tread overlying the said split, ribs and recesses, the said tread having at its inner face spaced members extending into the said recesses, and wires carried by said members and extending lengthwise within said recesses, the said wires engaging the outer sides of the reinforced casing ribs.

3. A wheel tire, comprising an outer casing having a split along the peripheral face of the casing and in the direction of the length thereof, the outer casing being provided with integral ribs at the sides of the split, and annular recesses adjacent the outer sides of said ribs, an annular tread overlying the said split, ribs and recesses, spaced clips secured on the inner face of the tread and having angular flanges extending into the said recesses, and ribs extending lengthwise within said annular recesses and secured on the inner sides of said flanges, the said ribs engaging the outer sides of the ribs of said casing.

4. A wheel tire, comprising an outer casing having a split along the peripheral face of the casing and in the direction of the length thereof, and a tread of a flat woven wire fabric removably attached to the said outer casing and overlying the said split.

5. A wheel tire, comprising an outer casing having a split along the peripheral face of the casing and in the direction of the length thereof, the outer casing being provided with reinforced ribs at the sides of the split and exterior recesses adjacent the said ribs, and a tread overlying the said split, ribs and recesses, and formed of a flat woven wire fabric provided at the inner face with engaging members extending into the said recesses and engaging the said casing ribs.

6. A wheel tire, comprising an outer casing having a split along the peripheral face of the casing and in the direction of the length thereof, the outer casing being provided with reinforced ribs at the sides of the split and exterior recesses adjacent the said ribs, and a tread overlying the said split, ribs and recesses and formed of a flat woven wire fabric provided at the inner face with clips having angular flanges extending into the said recesses, and ribs on the said flanges engaging the outer sides of the said casing ribs.

In testimony whereof I have signed my name to this specification in the presence of two subscribing witnesses.

LUKE G. FLEMING.

Witnesses:
 THEO. G. HOSTER,
 PHILIP D. ROLLHAUS.

Copies of this patent may be obtained for five cents each, by addressing the "Commissioner of Patents, Washington, D. C."